United States Patent [19]

Maznik

[11] Patent Number: 5,630,517
[45] Date of Patent: May 20, 1997

[54] HOLDER FOR HAIR STYLING TOOLS AND APPLIANCES

[76] Inventor: Gary Maznik, 5827 Grovewood Dr., Mentor, Ohio 44060

[21] Appl. No.: 501,205

[22] Filed: Jul. 11, 1995

[51] Int. Cl.⁶ .................................................. A47F 5/00
[52] U.S. Cl. .................. 211/70.6; 211/96; 211/DIG. 1; 248/309.4; 248/315; 248/282.1; 248/205.2; 248/205.5; 248/206.5
[58] Field of Search ........................ 211/87, 96, DIG. 1, 211/70.6, 100; 248/309.4, 315, 314, 282.1, 289.11, 309.1, 205.2, 205.5, 206.2, 206.3, 206.4, 206.5

[56] References Cited

U.S. PATENT DOCUMENTS

| | | |
|---|---|---|
| D. 243,559 | 3/1977 | Hoyle et al. . |
| D. 246,913 | 1/1978 | Kahn et al. . |
| D. 254,462 | 3/1980 | Heckathorn . |
| D. 261,818 | 11/1981 | Galuppo . |
| D. 286,238 | 10/1986 | Burton . |
| D. 305,944 | 2/1990 | Mellott . |
| D. 329,304 | 9/1992 | Tipp . |
| D. 332,670 | 1/1993 | McFarland . |
| D. 343,024 | 1/1994 | Blaisdell . |
| 1,975,303 | 10/1934 | Walker et al. ............... 248/315 X |
| 3,964,708 | 6/1976 | Reeves . |
| 4,065,084 | 12/1977 | Wiener . |
| 4,219,718 | 8/1980 | Assion . |
| 4,225,106 | 9/1980 | Eplan . |
| 4,308,878 | 1/1982 | Silva . |
| 4,607,752 | 8/1986 | Sherrow ..................... 211/70.6 X |
| 4,673,148 | 6/1987 | Oliver . |
| 4,682,698 | 7/1987 | Handler et al. ................ 211/96 X |
| 4,696,447 | 9/1987 | Strecker . |
| 4,712,313 | 12/1987 | Gettleman . |
| 4,746,090 | 5/1988 | Hamilton . |
| 4,874,142 | 10/1989 | Gelatt . |
| 4,973,019 | 11/1990 | Baird et al. . |
| 4,997,156 | 3/1991 | Allen ........................ 248/314 X |
| 5,028,026 | 7/1991 | Philipps et al. .............. 248/315 X |
| 5,062,529 | 11/1991 | Blair . |
| 5,064,154 | 11/1991 | Payne . |
| 5,090,649 | 2/1992 | Tipp . |
| 5,124,532 | 6/1992 | Hafey et al. . |
| 5,141,189 | 8/1992 | Andrew . |
| 5,172,880 | 12/1992 | McDougall . |
| 5,174,531 | 12/1992 | Perakis . |
| 5,221,006 | 6/1993 | Plumlee et al. ............. 248/309.4 X |
| 5,221,132 | 6/1993 | Combs et al. ............ 211/DIG. 1 X |

*Primary Examiner*—Robert W. Gibson, Jr.
*Attorney, Agent, or Firm*—Oldham & Oldham Co., LPA

[57] ABSTRACT

An apparatus for holding hair styling tools and appliances from a vertical support surface. The apparatus comprises, generally, a releasable base used to attach the apparatus to a wall or other vertical surface, a magnetized arm extending from the base and being frictionally attached for restrained movement about a vertical axis and a bracket extending from the magnetized arm for holding non-magnetic hair styling tools such as a hair dryer. In different embodiments, the bracket is optional and the base may be permanently attached to a vertical support surface.

24 Claims, 3 Drawing Sheets

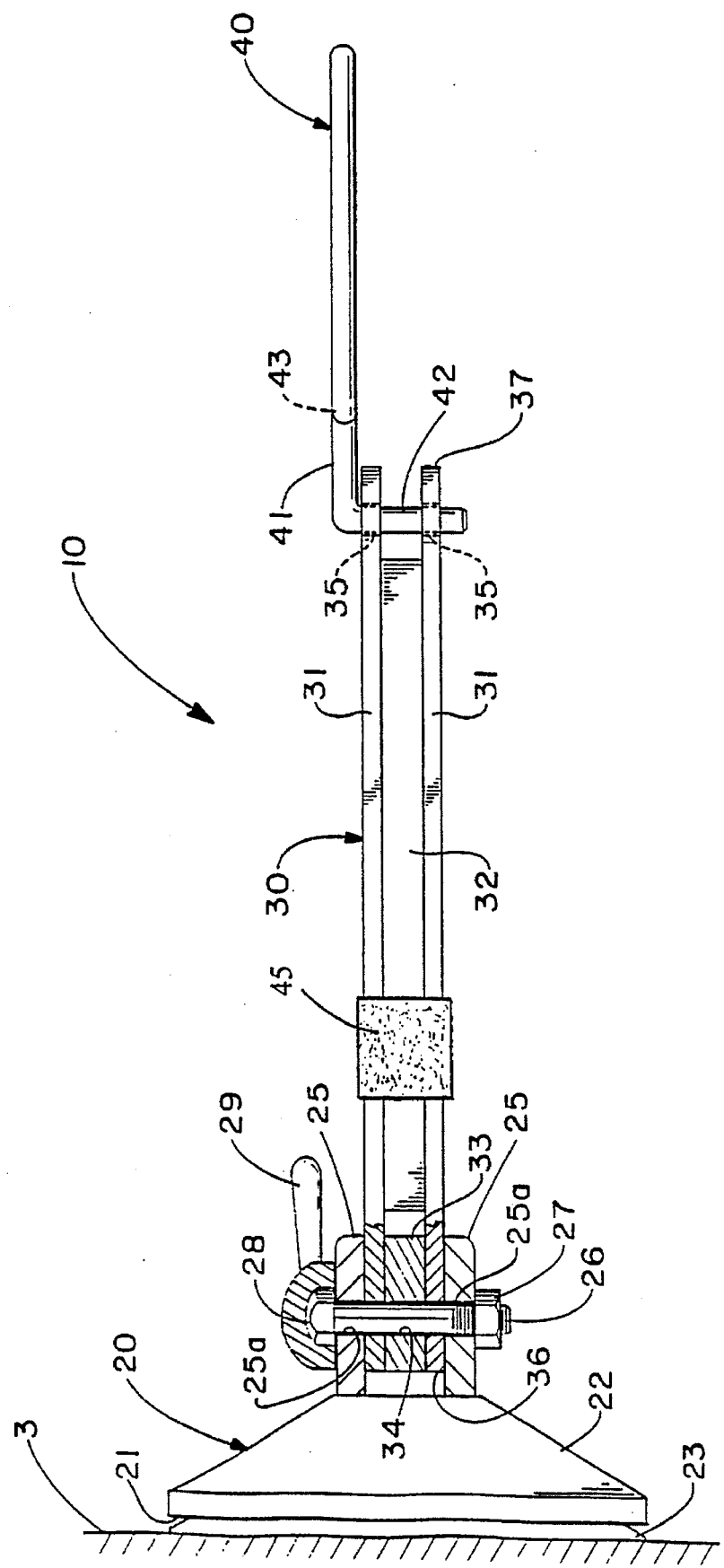

HOLDER FOR HAIR STYLING TOOLS AND APPLIANCES

TECHNICAL FIELD

This invention relates to the releasable holding of hair styling tools and appliances, and more particulary to the holding of curling irons and hair dryers for storage and during use, especially when the appliances are hot. The apparatus comprises, generally, a base with a suction cup, a magnetized arm extending from the base for holding a curling iron or other metallic tools and a bracket extending from the free end of the magnetized arm for holding a hair dryer.

BACKGROUND OF THE INVENTION

Hand-held electrical hair dryers and curling irons are common household hair styling devices that many times are used in conjunction with each other or alternatively by various members of the household. Due to space limitations in household bathrooms, where these devices are commonly used, many types of holders exist in the prior art. Known are holders designed to support hair dryers in operable positions so they may be used without being held by the user. Many holders also exist which are designed for only the storage of either hair dryers or curling irons. Because several of these devices are typically used together, known prior art holders tend to take up excessive space in household bathrooms. The prior art also neglects the multitude of other hair styling devices used other than hair dryers and curling irons.

Therefore, in light of the foregoing deficiencies in the prior art, applicant's invention is herein presented.

SUMMARY OF THE INVENTION

The present invention is directed to an apparatus for holding hair styling devices temporarily and in between use. A preferred embodiment of the apparatus comprises, generally, a base with a suction cup for removably mounting the apparatus to a vertical support surface, such as a wall or mirror, and a pivotable magnetic arm extending from the base for holding metallic hair styling devices. An alternate embodiment of the present invention employs a base wherein the suction cup is replaced by any permanent means for mounting the apparatus to a vertical support surface. Such means for securing the base would include, but are not limited to, screws and adhesives, all of which are common to one ordinarily skilled in the art. A further alternate embodiment of the present invention adds a bracket to the free end of the magnetic arm for holding other hair styling devices such as a hair dryer. Due to the magnetic holding properties of the current invention other metallic items such as scissors, combs, tweezers and razors can be held conveniently.

It is therefore the object of the present invention to provide a simple and convenient apparatus for holding hair styling tools that is portable and inexpensive, both to manufacture and purchase.

This along with other objects and advantages of the present invention will become more readily apparent from a reading of the detailed description taken in conjunction with the drawings.

BRIEF DESCRIPTION OF THE DRAWINGS

FIG. 4 is an elevational side view in partial cross-section of the apparatus shown in FIG. 1 with an additional non-metallic releasable retainer portion.

DETAILED DESCRIPTION OF THE PREFERRED EMBODIMENT

Figure 1:
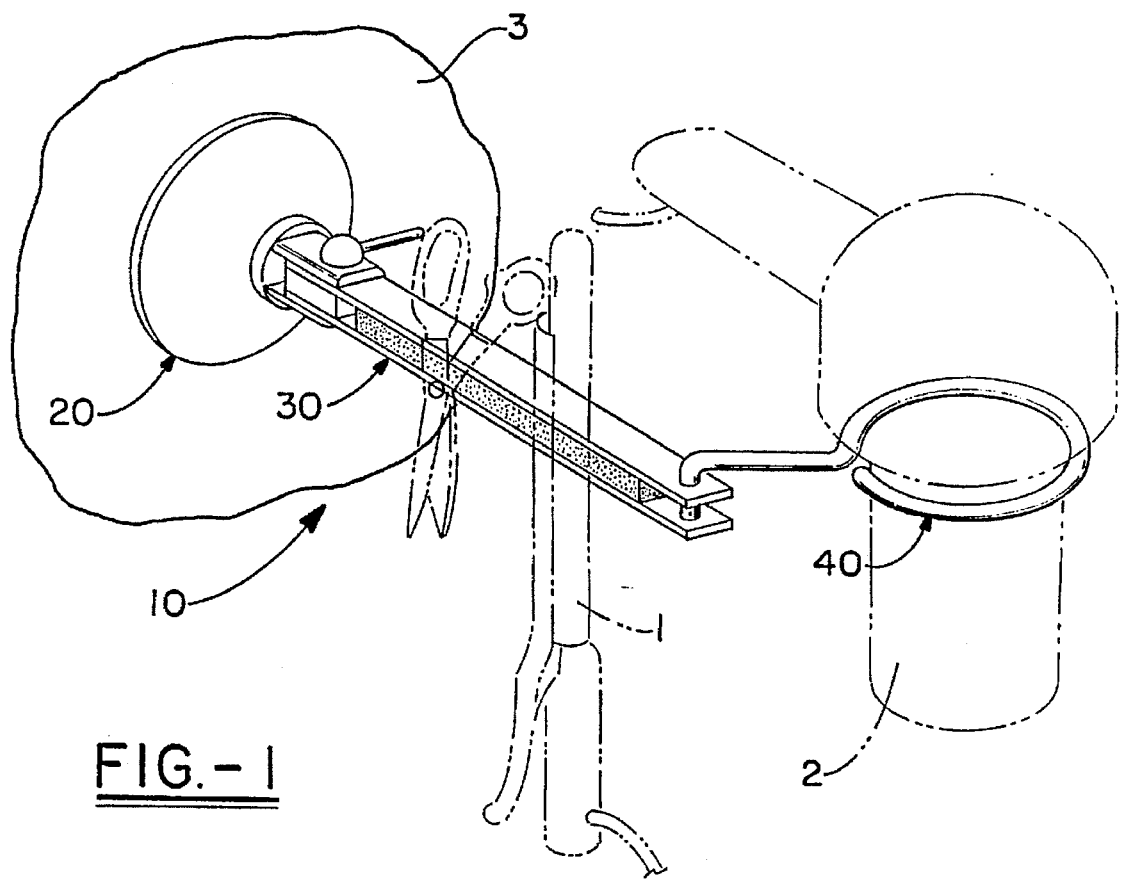
FIG. 1 is a perspective view of a holder for hair styling tools and appliances according to the present invention showing the typical use in conjunction with a hair dryer, a curling iron and other metallic hair styling tools.
Figure 3:
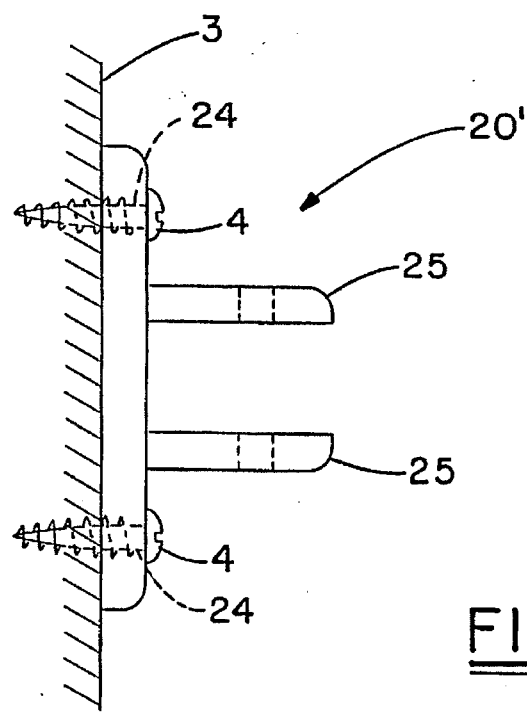
FIG. 3 is an elevational side view of an alternate embodiment of the base of the apparatus used for permanently mounting the apparatus to a vertical support surface.
Figure 2:
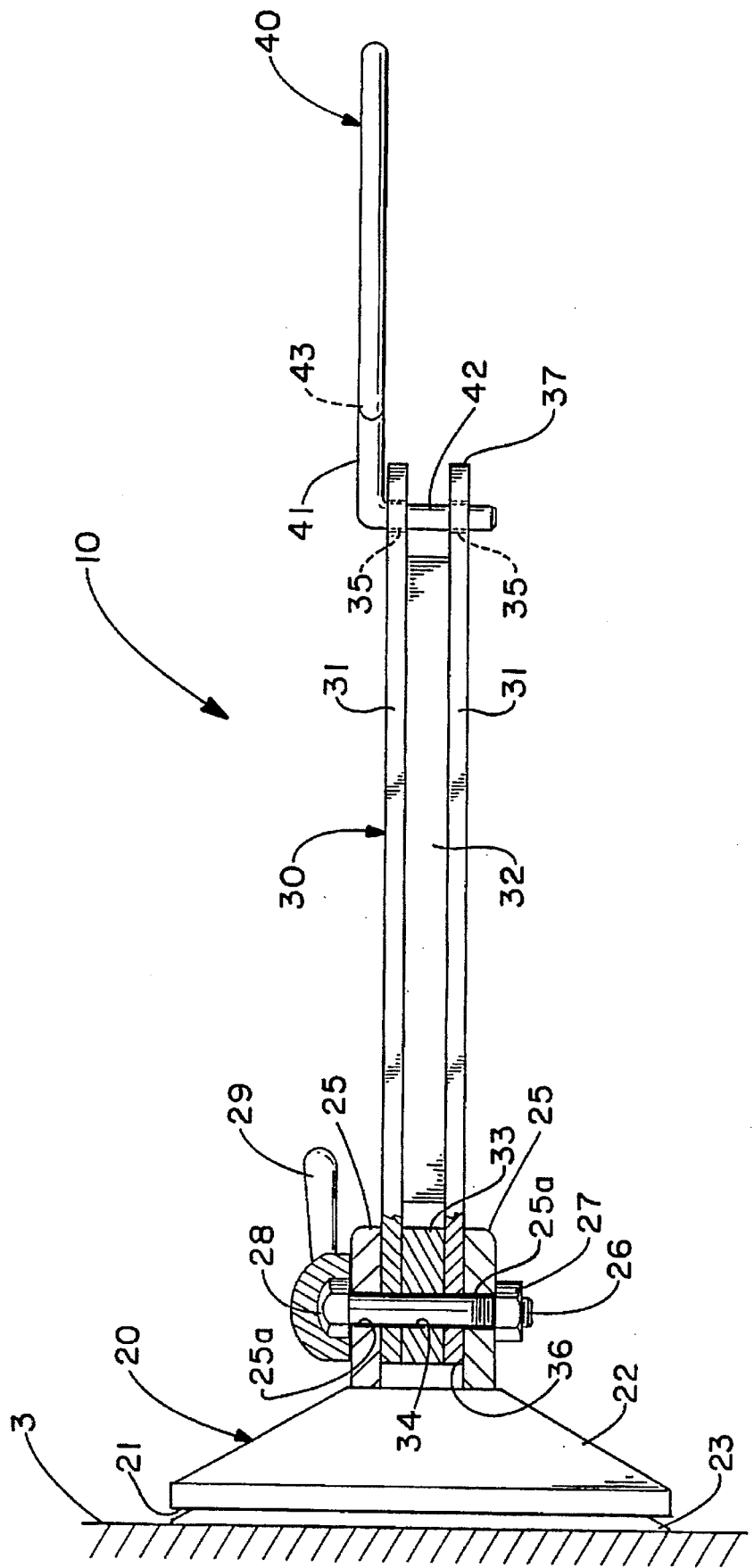
FIG. 2 is an elevational side view in partial cross-section of the apparatus shown in FIG. 1.

The apparatus of the present invention, generally 10, illustrated in FIGS. 1–3, comprises a base 20 and a magnetized arm 30 extending from the base 20. Apparatus 10 attaches to a vertical support surface, such as a wall or a mirror, and provides a holder for metallic hair styling devices such as a curling iron 1. An alternate embodiment further comprises a bracket 40 connected to the free end of the magnetized arm 30 for holding additional hair styling devices such as a hair dryer 2.

In a first preferred embodiment, best shown in FIG. 2, a base 20 having a suction cup 23 attached to the first side 21 of the base 20, is used to mount the apparatus 10 to a vertical support surface 3. This configuration allows for the apparatus 10 to be releasably attached making the apparatus 10 easily portable for use in different places, such as when the user is travelling. The use of a plurality of suction cups could be substituted in place of the single suction cup 23. An alternate embodiment, shown in FIG. 3, is of a base 20' that permanently mounts to a vertical support surface 3 by one or more screw coupling holes 24. The screw coupling holes 24 could be used in conjunction with screws 4, nails and other types of mechanical fasteners which are common to one ordinarily skilled in the art. Other means for releasably and permanently attaching the apparatus 10 to a vertical support surface 3 would include "VELCRO®", a multitude of different adhesives and other means common to one ordinarily skilled in the art.

In all embodiments of the base 20, the second side 22 of the base 20, shown in FIG. 2, has two hinge links 25 extending outward, spaced evenly apart and having holes 25a aligned linearly in each hinge link 25. The even spacing allows the magnetized arm's 30 first end 36 to be inserted in between the two hinge links 25 and secured by use of a hinge screw 26 through the holes 25a in the hinge links 25 and through a first set of holes 34 in the magnetized arm 30. The hinge screw 26 is fastened in position by a hinge nut 27, preventing the hinge screw 26 from being removed. The hinge screw head 28 has an optional hinge lever 29 attached to it, providing the user with a convenient means for adjusting the tension placed on the magnetized arm 30 by the two hinge links 25. This arrangement allows the user to alter the tension and adjust the magnetic arm 30 along a vertical axis and then tighten the tension once the magnetic arm 30 is in the desired position in order to maintain that position. The preferred material for the base 20 is plastic with the hinge links 25 being molded together with the base 20 as one piece, although it should be appreciated that hinge links 25 could be separate pieces attached to the second side 22 of the base 20 through any means common in the art. It is also contemplated that the base 20 could alternately be fabricated from metal, aluminum, wood or any other material used for consumer products common in the art.

The magnetic arm 30, as shown in FIG. 2, comprises two elongated support members 31 with an elongated permanent magnet 32 sandwiched therebetween. The two elongated support members 31 are sufficiently longer than the elongated permanent magnet 32 and positioned to provide space free of the elongated permanent magnet 32 on both ends of the magnetic arm 30 for connecting the first end 36 of magnetic arm 30 to the base 20 and in an alternate embodiment, connecting the second end 37 of magnetic arm 30 to the bracket 40. The second end 37 of magnetic arm 30 has a second set of holes 35, aligned linearly through both elongated support members 31 to provide female connection for bracket 40.

A spacer 33 is placed between the two elongated support members 31 at the first end 36 of magnetic arm 30. The spacer 33 has a hole passing through its center to allow the hinge screw 26 to pass through it and is used to provide further tension between the hinge links 25 and the elongated support members 31 which prevents damage to the apparatus 10 from overtightening of the hinge lever 29. The spacer 33 is fabricated from plastic but could be made of other suitable materials such as wood, metal or aluminum. The two elongated support members 31 are attached to opposite surfaces of the elongated permanent magnet 32 by a heat resistant adhesive but other means of attachment common in the art are also contemplated.

The magnetic arm 30 has also been contemplated to comprise various alternative combinations of support members and magnets such as a single support member with several smaller magnetic regions mounted on or through the support member or even a single magnet formed into the magnetic arm 30 alone. Any combination that provides an elongated magnetic member fulfills the requirements of the magnetic arm 30. The magnetic arm 30 can be constructed of any suitable materials but limited in that any such material must be heat resistant if intended to come into proximity or direct contact with hot hair styling devices such as a curling iron 1. This is also a consideration for base 20 if the materials used for the magnetic arm 30 are capable of transmitting heat to the base 20.

Additionally contemplated and shown in FIG. 4 is arm 30 functioning independently of any magnetic effect through the use of hook and loop or other comparable releasable retainers. At least one elongated support member 31 would be lined with one half of the hook and loop fastener 45 while hair styling devices such as scissors and curling iron 1 would have the cooperating portion of the hook and loop fastener (not shown in FIG. 4) oppositely attached for releasably coupling the devices to arm 30. Each elongated support member 31 could be lined with one portion of the two-part hook and loop fastener 45 on both sides providing maximum versatility in holding hair styling devices. By providing releasable holding independant of magnetism hair styling devices such as plastic combs, which magnetic forces will not retain, can be accomodated. It is also to be appreciated that regions of hook and loop could also be used in various combinations with magnetic arm 30 to provide concurrent utilization of the holder for both metallic and non-metallic utensils.

In a further embodiment of the present invention, as shown in FIG. 2, a bracket 40, having a support hinge 42, is attached to the second end 37 of the magnetic arm 30 for the further storage of other hair styling devices such as a hair dryer 2. The bracket 40 is most preferably fabricated from a single piece of material common in the art such as plastic or metal, is circular in shape and has a support 41 extending from the circular shape which ends in a right angle bend forming a support hinge 42. The support hinge 42 is inserted through the second set of holes 35 in the second end 37 of the magnetic arm 30 allowing the bracket 40 to rotate about a vertical axis. Bracket 40's diameter is approximately three inches but could be larger or smaller to accommodate different size hair styling devices. It is contemplated by the inventor that a gun type hair dryer would be placed in the bracket, barrel end first, as illustrated in FIG. 1. If types of devices without barrels are used then a small gap 43 may be maintained in the bracket 40 to makes their insertion less cumbersome. The gap 43 allows the electrical cord to fit into the bracket, preventing the cord from being twisted or stuffed through the bracket 40. The bracket 40 is also contemplated without the gap 43 and also could be constructed from more than a single piece of material. While the brackets 40 circular shape is preferred, it is not necessary and other shapes would work adequately.

The apparatus 10 can be permanently mounted to a wall or temporarily mounted to any smooth surface such as a mirror or window. The size of the apparatus 10 and its portability make it ideal for travelling. The apparatus 10 allows the user to store hair dryers, curling irons and other hair styling devices in a space saving manner, even while such devices are hot.

The apparatus 10 also saves space because it can be positioned for easy access while in use and when being used for general storage, positioned out of the user's way. The apparatus 10 is also suitable for use in kitchens for holding knives, hand held blenders and other tools and appliances. It would also provide for the holding of tools such as screw drivers, wrenches and hand held drills.

While in accordance with the patent statutes the best mode and preferred embodiment of the present invention has been described, it is to be understood that the invention is not limited thereto, but rather is to be measured by the scope and spirit of the appended claims.

What is claimed is:

1. An apparatus for holding household tools and appliances from a support surface, comprising:
   a base for securing said apparatus to said support surface, said base having at least a first side and a second side;
   a means for securing said first side of said base to said support surface;
   an arm having a first end and a second end, said first end connected to said second side of said base wherein said arm has a magnetic means for releasably securing said household tools and appliances; and
   a bracket connected to said second end of said arm for holding at least one said household tool or appliance.

2. An apparatus as recited in claim 1, wherein said first end of said arm is frictionally connected to said second side of said base such that said arm pivots about a vertical axis.

3. An apparatus as recited in claim 1, wherein said bracket is pivotally connected to said second end of said arm.

4. An apparatus as recited in claim 1, wherein said bracket is a frame having a support extending therefrom for connecting to said second end of said arm.

5. An apparatus as recited in claim 3, wherein said frame is substantially closed with a gap preventing said frame from being completely closed.

6. An apparatus as recited in claim 5, wherein said frame is circular in shape.

7. An apparatus as recited in claim 1, wherein said means for securing said base to said support surface is releasable.

8. An apparatus as recited in claim 7, wherein said releasable means for securing said base is at least one releasable suction cup securely connected to said first side of said base.

9. An apparatus as recited in claim 1, wherein said means for securing said base to said support surface is permanent.

10. An apparatus as recited in claim 1, wherein said arm comprises a support structure which allows for said arm to be connected between said second side of said base and said first end of said support structure.

11. An apparatus as recited in claim 1, wherein said magnetic means is an elongated permanent magnet.

12. An apparatus as recited in claim 10, wherein said support structure is a plurality of elongated support members.

13. An apparatus as recited in claim 12, wherein each said elongated support member has holes aligned linearly at each end providing a female connection that allows for insertion of said first end of said arm into said base and insertion of said support hinge of said bracket into said second end of said arm.

14. An apparatus as recited in claim 1, wherein said arm contains a non-magnetic means for releasably securing said house hold tools and appliances.

15. An apparatus as recited in claim 14, wherein said non-magnetic means comprises one half of a hook and loop fastener.

16. An apparatus for holding household tools and appliances from a support surface, comprising:

a base for securing said apparatus to said support surface, said base having at least a first side and a second side;

a means for securing said first side of said base to said support surface;

an arm having a first end and a second end, said first end connected to said second side of said base wherein said arm has a hook and loop means for releasably securing said household tools and appliances; and a bracket connected to said second end of said arm for holding at least one said household tool or appliance.

17. An apparatus as recited in claim 16, wherein said first end of said arm is connected to said second side of said base such that said arm pivots about a substantially vertical axis.

18. An apparatus as recited in claim 16, wherein said bracket is pivotally connected to said second end of said arm.

19. An apparatus as recited in claim 16, wherein said frame is substantially closed with a gap preventing said frame from being completely closed.

20. An apparatus as recited in claim 19, wherein said frame is circular in shape.

21. An apparatus as recited in claim 16, wherein said means for securing said base to said support surface is releasable.

22. An apparatus as recited in claim 16 wherein said means for securing said base to said support surface is permanent.

23. An apparatus as recited in claim 16, wherein said arm comprises a support structure which allows for said arm to be connected between said second side of said base and said first end of said support structure.

24. An apparatus as recited in claim 24, wherein said support structure is a plurality of elongated support members.

* * * * *